United States Patent
Kellberg

(10) Patent No.: US 9,048,530 B2
(45) Date of Patent: Jun. 2, 2015

(54) DEPLOYABLE FLAT PANEL ARRAY

(75) Inventor: Christian Kellberg, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 106 days.

(21) Appl. No.: 13/044,230

(22) Filed: Mar. 9, 2011

(65) Prior Publication Data

US 2012/0227916 A1  Sep. 13, 2012

(51) Int. Cl.
| | |
|---|---|
| *E06B 3/48* | (2006.01) |
| *E06B 7/086* | (2006.01) |
| *H02N 6/00* | (2006.01) |
| *H01L 31/042* | (2014.01) |
| *H01Q 1/08* | (2006.01) |
| *B64G 1/22* | (2006.01) |
| *H01Q 21/06* | (2006.01) |
| *B64G 1/44* | (2006.01) |

(52) U.S. Cl.
CPC .............. *H01Q 1/084* (2013.01); *B64G 1/222* (2013.01); *H01Q 21/061* (2013.01); *B64G 1/44* (2013.01)

(58) Field of Classification Search
CPC .......... B64G 1/222; B64G 1/443; A47G 5/02; E06B 9/42; E06B 3/485; G09F 15/0068
USPC ...................... 160/135, 229.1, 113, 115, 220; 244/172.6, 172.7; 136/244, 245, 246
See application file for complete search history.

(56) References Cited

U.S. PATENT DOCUMENTS

| | | | |
|---|---|---|---|
| 4,015,653 A | | 4/1977 | Slysh et al. |
| 4,147,198 A | * | 4/1979 | Ytter ............................ 160/135 |
| 4,685,681 A | * | 8/1987 | Rubik et al. .................. 273/155 |
| 5,515,900 A | * | 5/1996 | West et al. .................... 160/135 |
| 5,520,747 A | * | 5/1996 | Marks ........................... 136/245 |
| 5,785,280 A | * | 7/1998 | Baghdasarian ............ 244/172.6 |
| 5,909,860 A | * | 6/1999 | Lee ........................... 244/172.6 |
| 5,961,738 A | | 10/1999 | Benton et al. |
| 6,147,294 A | | 11/2000 | Dailey et al. |
| 6,188,012 B1 | | 2/2001 | Ralph |
| 6,423,895 B1 | | 7/2002 | Murphy et al. |

(Continued)

FOREIGN PATENT DOCUMENTS

| | | |
|---|---|---|
| GB | 2455311 A | 6/2009 |
| JP | 7187089 A | 7/1995 |

(Continued)

OTHER PUBLICATIONS

"Dynamics of an Elastically Deployable Solar Array: Ground Test Model Validation"; Jorgensen et al; Mar. 21, 2005; accessed from http://www.engr.uconn.edu/~mallar/SDM2005StudentPapers/pdf/2005_1942.pdf on Aug. 6, 2012.*

(Continued)

*Primary Examiner* — Katherine Mitchell
*Assistant Examiner* — Jeremy Ramsey
(74) *Attorney, Agent, or Firm* — Burns & Levinson LLP; Joseph M. Maraia

(57) ABSTRACT

The deployable flat panel array technology includes panel arrays and/or methods for multi-axial deployment of a panel array. The panel array can include a first row of panels, a second row of panels, and at least two respective panels of each of the first and the second rows coupled together via a carpenter tape hinge and allowing for multi-axial deployment to form the panel array.

17 Claims, 8 Drawing Sheets

(56) References Cited

U.S. PATENT DOCUMENTS

| | | | |
|---|---|---|---|
| 6,637,702 B1 * | 10/2003 | McCandless | 244/172.6 |
| 7,211,722 B1 | 5/2007 | Murphy | |
| 7,354,033 B1 | 4/2008 | Murphey et al. | |
| 7,513,461 B2 | 4/2009 | Reutenauer et al. | |
| 8,511,615 B2 * | 8/2013 | Baudasse et al. | 244/172.6 |
| 2003/0164186 A1 * | 9/2003 | Clark et al. | 136/245 |
| 2004/0094193 A1 * | 5/2004 | Geyer et al. | 136/244 |
| 2005/0126106 A1 | 6/2005 | Murphy et al. | |
| 2012/0024342 A1 * | 2/2012 | Kalman | 136/245 |

FOREIGN PATENT DOCUMENTS

| | | | |
|---|---|---|---|
| JP | 7223597 A | 8/1995 | |
| JP | 2000/059122 A | 2/2000 | |
| JP | 2000/280997 A | 10/2000 | |

OTHER PUBLICATIONS

J. Huang et al.; Foldable Frame-Supported Thin-Membrane Array; Jet Propulsion Laboratory; California Institute of Technology; Apr. 10, 2006; 4 pages.

John Huang; Spacecraft Antenna Research and Development Activities Aimed at Future Missions; Chapter 10; Apr. 10, 2006; pp. 485-536.

European Search Report; European Searching Authority; Application No. EP 12150521; Date Completed: Jun. 6, 2012.

* cited by examiner

DEPLOYABLE FLAT PANEL ARRAY

BACKGROUND

Flat panel arrays are generally deployed uni-directionally. The storage of the uni-directionally deployed flat panel arrays is generally the constraining factor for the deployment size of the flat panel array due to size constraints during transportation (e.g., spacecraft transportation, aircraft transportation, etc.). Thus, there is a need in the art for an improved flat panel array.

SUMMARY

One approach provides a deployable flat panel array that utilizes a carpenter tape hinge for multi-axis deployment. The panel array includes a first row of panels, a second row of panels, and at least two respective panels of each of the first and the second rows coupled together via a carpenter tape hinge and allowing for multi-axial deployment to form the panel array.

Another approach provides a deployable flat panel array that utilizes a spring hinge means for multi-axis deployment. The panel array includes a first row of panels, a second row of panels, and at least two respective panels of each of the first and the second rows coupled together via a spring hinge means and allowing for multi-axial deployment to form the panel array.

Another approach provides a deployable two-dimensional panel array that allows deployment between a packed position and a deployed planar position. The panel array includes a plurality of interconnected panel rows coupled via a spring hinge means, wherein each panel row comprising a plurality of panels coupled together, and wherein the panel array being deployable along two dimensions between a packed position and a deployed planar position.

Another approach provides a method for deploying a flat panel array. The method includes folding a first row of panels and a second row of panels, wherein each row comprising at least two respective panels coupled via a carpenter tape hinge to form the panel array and allowing for multi-axial deployment of the panel array, wherein the folding generates a spring force. The method further includes holding the first and the second rows in a packed position via a holding mechanism. The method further includes deploying the first and second rows along a first-axis using the spring force in the carpenter tape hinge. The method further includes deploying the panels for each row along a second-axis using a deployment mechanism.

Any of the approaches described herein can include one or more of the following examples.

In some examples, the panel array is formable substantially along an x-y-axis.

In other examples, the panel array is formable substantially in a planar shape.

In some examples, the panel array is deployable substantially in a planar direction.

In other examples, the at least two respective panels from each of the first and the second rows are deployable substantially along a first-axis and the first and the second rows are deployable substantially along a second-axis.

In some examples, the first-axis and the second-axis are formable substantially for coplanarity between the deployed first and the deployed second rows.

In other examples, the panel array further includes a plurality of panels of the first and the second rows, wherein the plurality of panels are stowable substantially in an accordion array.

In some examples, the panel array is packable substantially along an x-z-axis.

In other examples, the at least two respective panels of each of the first and the second rows are coupled such that the first and the second rows are simultaneously deployed.

In some examples, the panel array further includes a second set of panels of the panel array. The second set of panels includes a third row of panels, a fourth row of panels, and at least two respective panels of each of the third and the fourth rows coupled together via a carpenter tape hinge and allowing for multi-axial deployment to form the panel array. The first row, the second row, and the at least two respective panels for the first and the second rows include a first set of panels of the panel array.

In other examples, the first set of panels and the second set of panels are interleaved for storage.

In some examples, the first set of panels and the second set of panels are independently deployable.

In other examples, the panel array includes a solar panel array or a radar array panel.

In some examples, the plurality of interconnected panel rows are interconnected at each end of the plurality of interconnected panel rows.

In other examples, in the packed position, the plurality of interconnected panel rows are interleaved.

In some examples, the first-axis and the second-axis are formable substantially for coplanarity between the deployed first and the deployed second rows.

In other examples, the method further includes packing the panel array in the packed position in a vehicle; moving the vehicle from a first location to a second location; and unpacking the panel array from the vehicle for deployment.

In some examples, the method further includes transporting the panel array in the packed position to a second location for deployment. The panel array is mounted to a vehicle or associated with a vehicle as a separate component.

The deployable flat panel array technology described herein can provide one or more of the following advantages. An advantage of the technology is the compact storage of the stowed panel array which decreases the transportation cost of the technology. Another advantage to the technology is the compact storage of the stowed panel array which increases the effective uses of the technology by decreasing storage costs. Another advantage to the technology is the deployment mechanism includes a uni-directional deployment driver (e.g., inflatable structure, roll-up flat section, etc.) and a passive deployment driver (e.g., carpenter tape hinge) which decreases the production costs of the technology and increases the reliability of the technology.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

The deployable panel array technology as described herein enables large aperture flat panel arrays and/or large area solar arrays to be efficiently moved and deployed. For example, the deployable panel array technology is utilized where compact stowage is required (e.g., launch vehicle fairing constraint, maximum payload size, etc.), but a large array is needed (e.g., solar panel, radio array, radar array, etc.).

The technology includes an array and/or a method to deploy a large area flat panel array (e.g., eighty feet high by forty feet wide by half an inch thick, two hundred feet high by sixty feed wide by two inches thick, etc.) that can be folded and stowed in a small volume. The technology utilizes an accordion style folded array that has a low profile thickness relative to its area. The accordion style folded array includes discrete groups of folding elements (e.g., row of panels). The groups of folding elements are advantageously arranged such that the total stowed package is shorter, by at least a factor of three, and the final deployed shape has an area aspect ratio larger, by at least a factor of three, than what can be achieved with unidirectional accordion unfolding.

The technology advantageously enables shorter stowed packaging and/or wider deployed area arrays due to the utilization of the accordion style folding action. The technology enables the use of low profile electronics in the deployable panel array. The low profile electronics can distribute, transmit, receive, and/or capture solar energy over a large area, membrane, film, and/or thin tile network. The technology can have a high stiffness to weight ratio via the utilization of a composite framing support structure which enables a thin overall folded group package.

The technology utilizes a staged lateral rotation (deployment) of alternating element groups and then a secondary uni-directional unfolding (deployment) for the deployment of the flat panel array. The resulting deployable array can have a deployed area wider by at least a factor of three and a stowed area with compactness shorter by at least a factor of three, when compared to an accordion uni-directional unfolding approach. The deployment mechanism of the technology can be unidirectional (e.g., single driver enabled) and the staged lateral array group rotations can be a passive convex strip of graphite composite linkage (e.g., carpenter tape hinge).

Figure 1B:
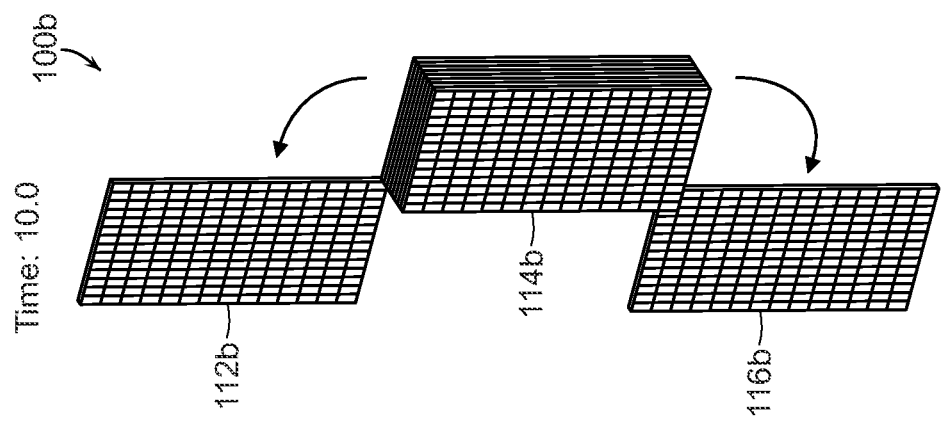
FIGS. 1A-1D are diagrams illustrating an exemplary deployment of a flat panel array.
Figure 1A:
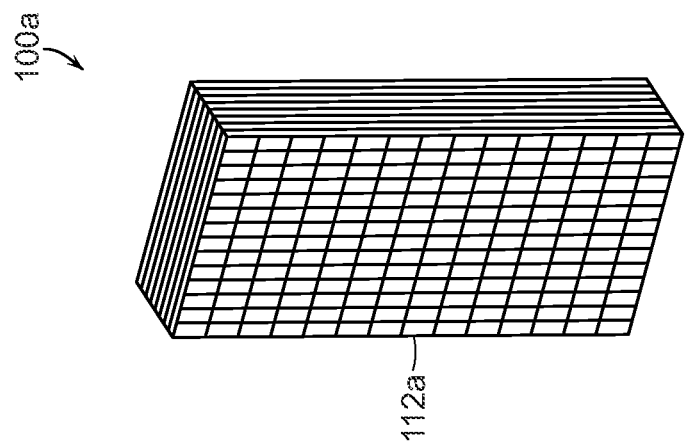

FIGS. 1A-1D are diagrams illustrating an exemplary deployment of a flat panel array 100a, 100b, 100c, and 100d, respectively. FIG. 1A illustrates the flat panel array 100a in a stowed position. The flat panel array 100a is stowed substantially in an accordion array 112a. FIG. 1B illustrates the flat panel array 100b deployed along a y-axis. The flat panel array 100b includes three rows of panels 112b, 114b, and 116b. The flat panel array 100b is deployed from the flat panel array 100a via carpenter tape hinges (not shown). The carpenter tape hinges couple the rows of panels 112b and 114b together and the rows of panels 114b and 116b together (e.g., directly coupled together, indirectly coupled together, etc.).

Figure 1D:
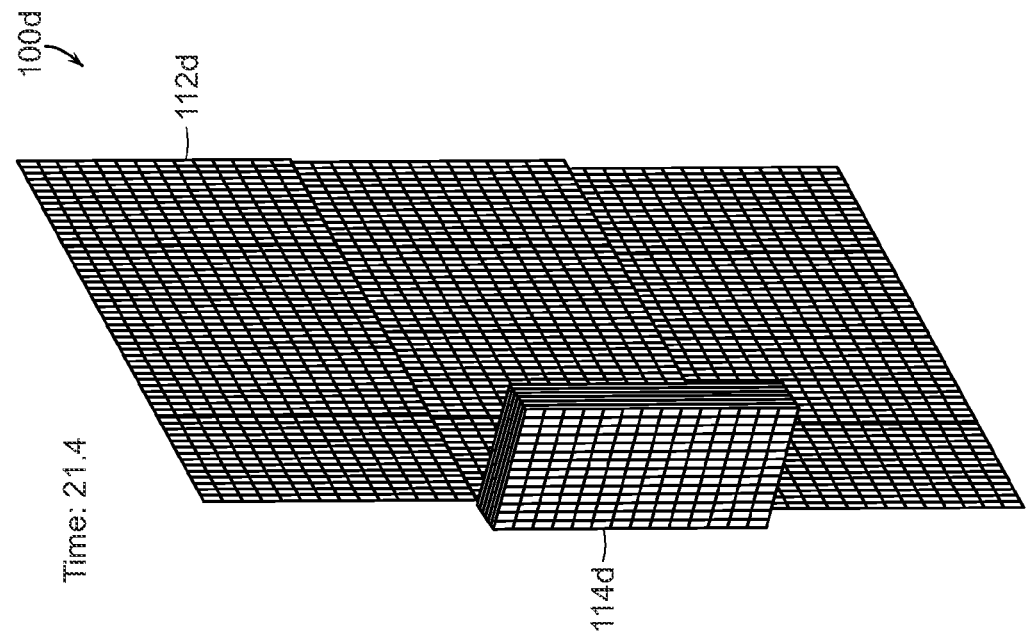
Figure 1C:
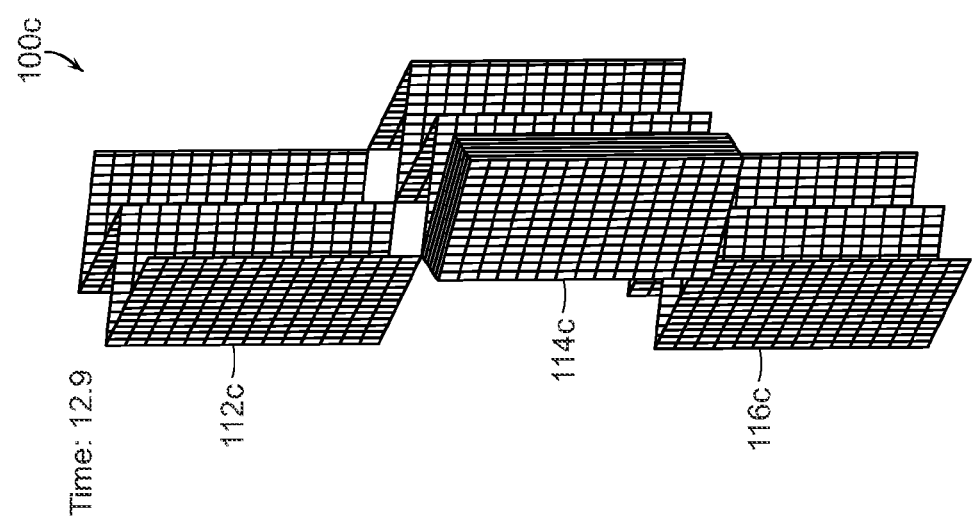

FIG. 1C illustrates the flat panel array 100c partially deployed along an x-axis. The flat panel array 100c includes three rows of panels 112c, 114c, and 116c. A deployment mechanism (not shown) deploys the flat panel array 100c along the x-axis. The deployment mechanism can be any type of device (e.g., motor mounted to a worm gear, pulley system, etc.).

FIG. 1D illustrates part of a deployed flat panel array 100d. The flat panel array 100d includes a stowed portion 114d and a deployed portion 112d (also referred to as the deployed planar position). As illustrated in FIG. 1D, the deployed portion 112d is deployed along the x-axis and the y-axis (in other words, multi-axial deployment to form the panel array 112d). In other words, the panel array 112d is formable substantially in two-dimensions (x-y axis). As illustrated in FIGS. 1A-1D, the deployed portion of the flat panel array 112d is deployed substantially in a planar direction.

The three rows of panels 112b, 114b, and 116b include a plurality of panels. Each of the panels in a row can be connected via any type of connection mechanism (e.g., hinge, joint, etc.). As illustrated in FIG. 1A, the plurality of panels for each row are stowed substantially in an accordion array. As illustrated in FIG. 1A, the plurality of panels for each row are interleaved in the packed position (also referred to as the stowed position). In other examples, the panel array 100a is packed substantially along an x-z axis.

The stowed portion of the panel array 114d includes another set of panels of the panel array. The second set of panels can include a plurality of rows of panels (in this example, three rows of panels). As described herein, the plurality of rows of panels can be deployed, coupled together, and/or inter-connected together.

As illustrated in FIG. 1A, the sets of panels are interleaved for storage. In some examples, the first set of panels and the second set of panels are independently deployable as illustrated in FIGS. 1A-1D. For example, a first holding mechanism (e.g., spring hinge, lock, etc.) holds the first set of panels in a stored position and a second holding mechanism holds the second set of panels in a stored position. In this example, the first holding mechanism releases the first set of panels for deployment and the second holding mechanism holds the second set of panels in the stored position.

In other examples, at least two respective panels of two of the rows are coupled together via a carpenter tape hinge. In some examples, the at least two respective panels are deployable substantially along a first axis (in this example, x-axis) and the rows are deployable substantially along a second axis (in this example, y-axis). In other examples, the first-axis and the second-axis are formable substantially for coplanarity between the deployed first and the deployed second rows (e.g., perpendicular deployment configuration, radial deployment configuration, etc.). In some examples, the at least two respective panels are coupled such that the first and the second rows are simultaneously deployed as illustrated in FIG. 1C.

Figure 2A:
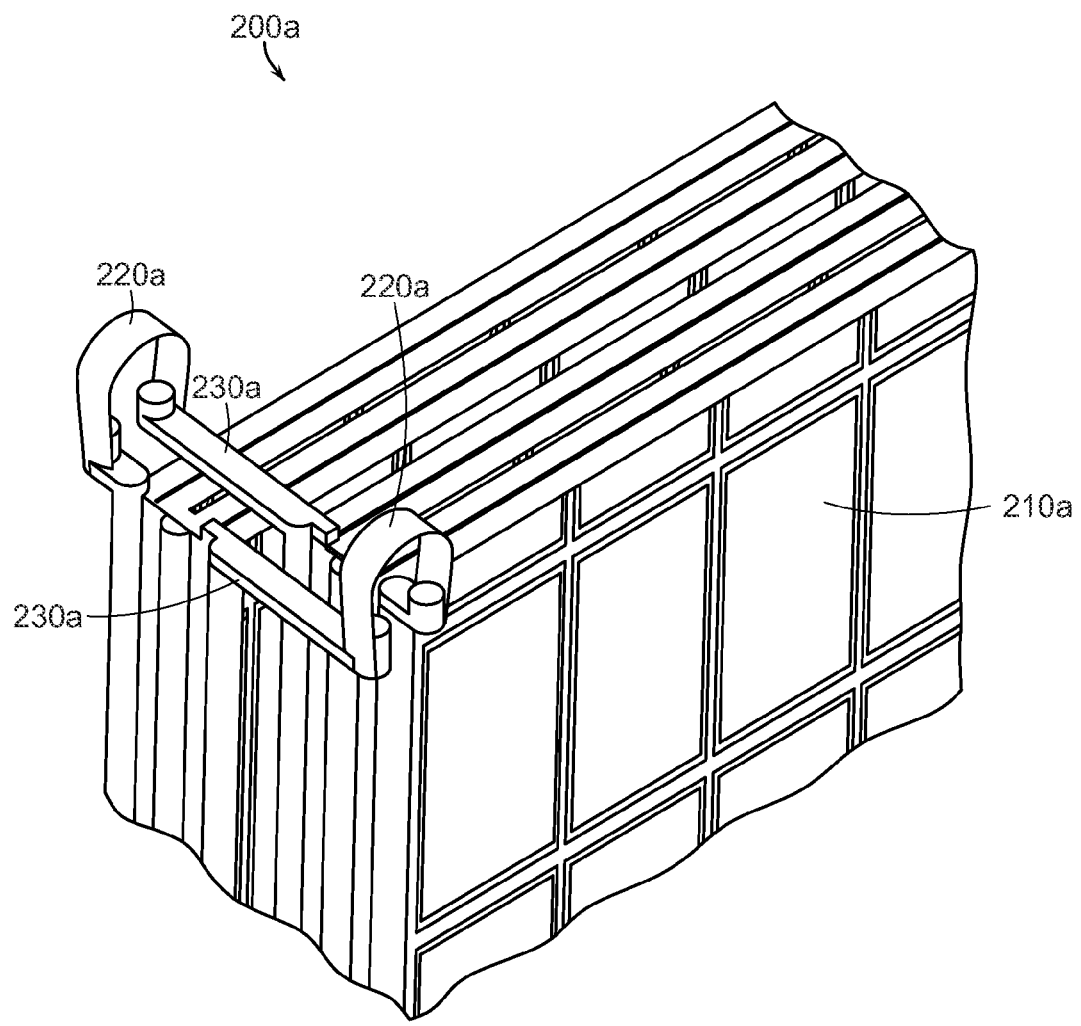
FIGS. 2A-2C are diagrams illustrating an exemplary deployment via a carpenter tape hinge.
Figure 2B:
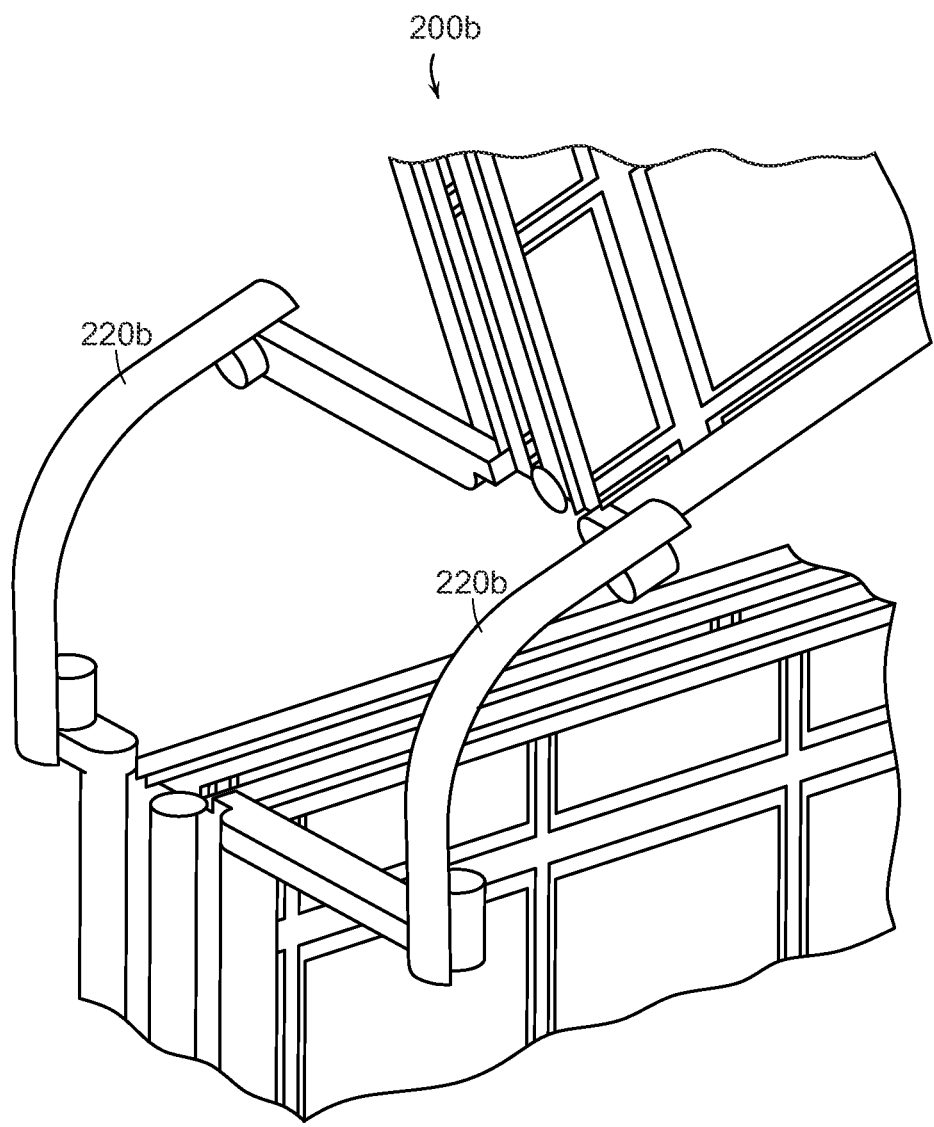
Figure 2C:
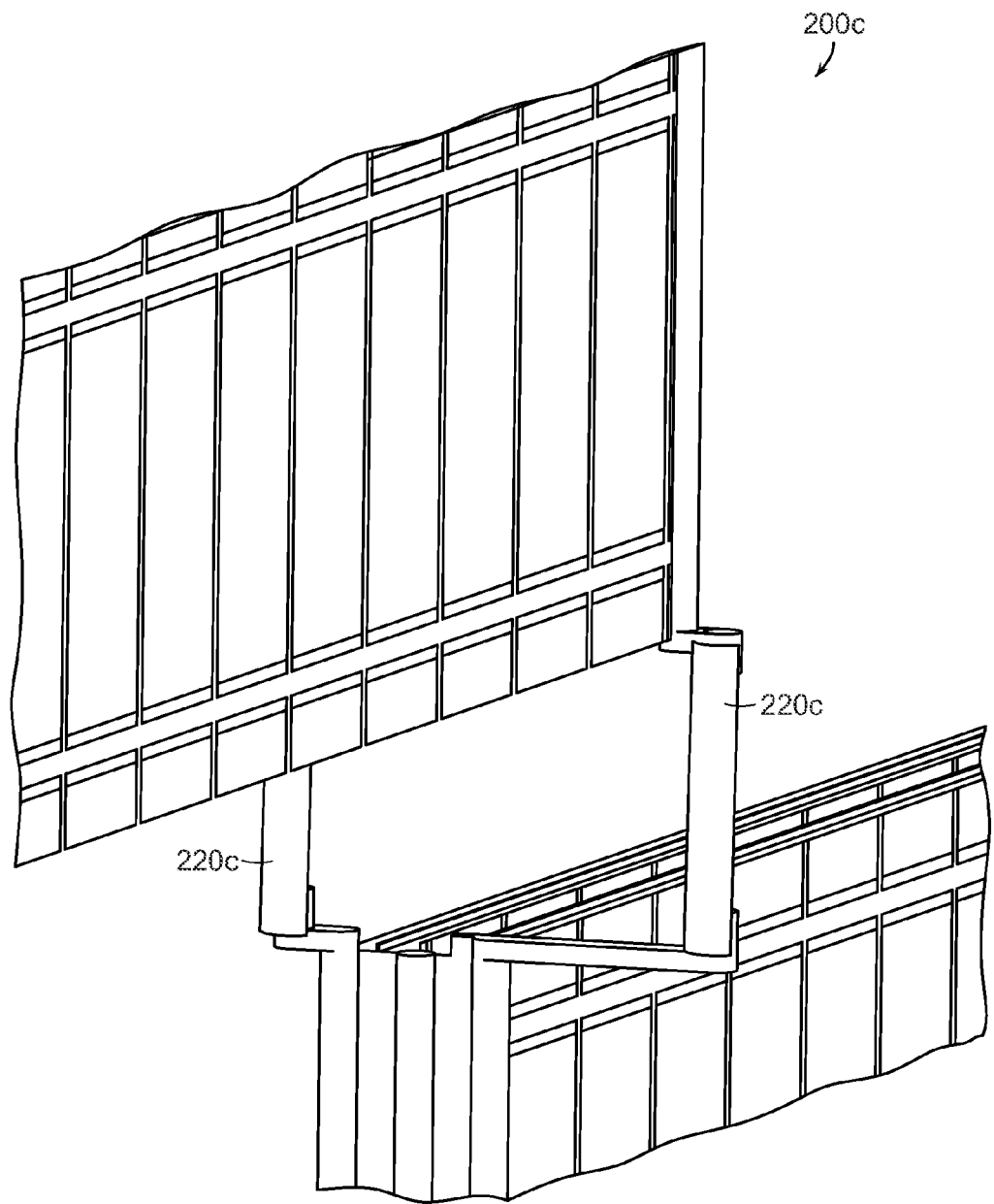

FIGS. 2A-2C are diagrams illustrating an exemplary deployment of a flat panel array 200a, 200b, and 200c via carpenter tape hinges 220a, 220b, and 220c, respectively. FIG. 2A illustrates the flat panel array 200a in a packed position. The flat panel array 200a includes two rows of panels that are coupled together via carpenter tape hinges 220a. The two rows are off-set via panel linkages 230a (e.g., metal bar, plastic mounting strip, etc.). The panel linkages 230a position the rows of panels together for interleaved storage of the flat panel array 200a. As illustrated in FIG. 2A, the first row of panels is stored next to the second row of panels. In some examples, a holding mechanism (not shown) holds the first row of panels and the second row of panels in the packed position.

FIG. 2B illustrates the flat panel array 200b partially deployed along a y-axis. The carpenter tape hinges 220b release stored energy to deploy the flat panel array 200b from the packed position. In other examples, the holding mechanism (not shown) is released and the stored energy within the compacted carpenter tape hinges 220a. FIG. 2C illustrates the flat panel array 200c deployed along a y-axis. The carpenter tape hinges 220c are released and the flat panel array 200c is in a partially deployed position.

In other examples, the panel linkages 230a can be any length and/or size. For example, the panel linkages 230a can off-set the rows by four centimeters (in others words, an air gap of four inches between the rows of panels). As another example, the panel linkages 230a can off-set the rows with substantially no space between the rows (e.g., 0.0001 centimeters, 0.000001 centimeters, etc.).

Although FIGS. 2A-2C illustrate carpenter tape hinges 220a, 220b, and 220c, any type of spring hinge mechanism can be utilized to couple the panels together. The spring hinge mechanisms can, for example, include a spring hinge, tape spring hinge, and/or any other mechanism for storage and release of energy. In other examples, the carpenter tape hinges 220a, 220b, and 220c can be positioned at various locations on the rows of panels (e.g., hinges at the center of the first respective panels, hinges at the end of the fourth respective panels, etc.).

As illustrated in FIGS. 2A-2C, the rows of panels are interconnected at each end of the plurality of interconnected panel rows. In other words, the middle parts of the rows of panels are not interconnected together.

Figure 3B:
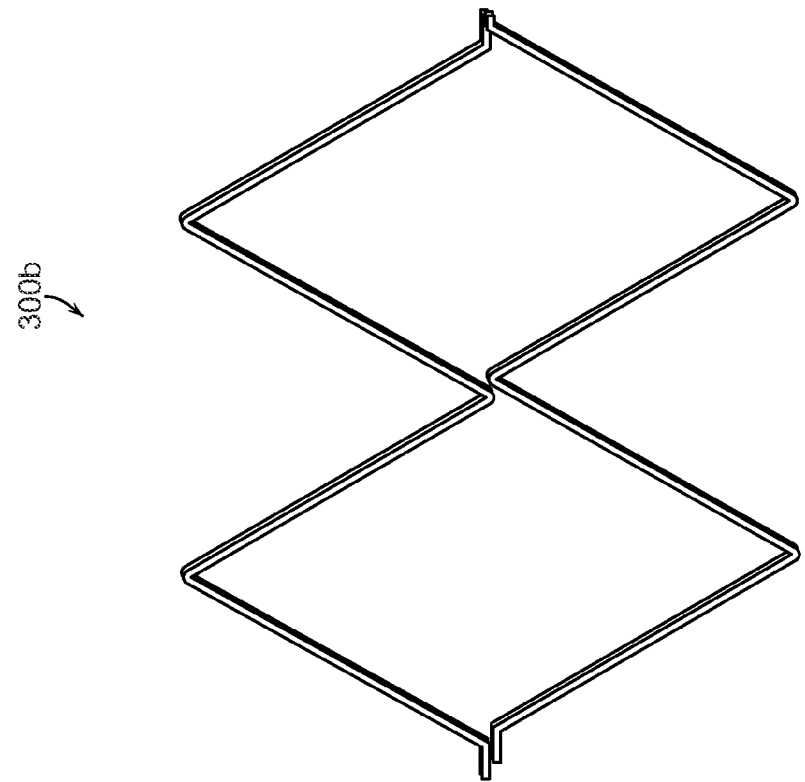
FIGS. 3A-3B are diagrams illustrating an exemplary connection mechanism between flat panel arrays.
Figure 3A:
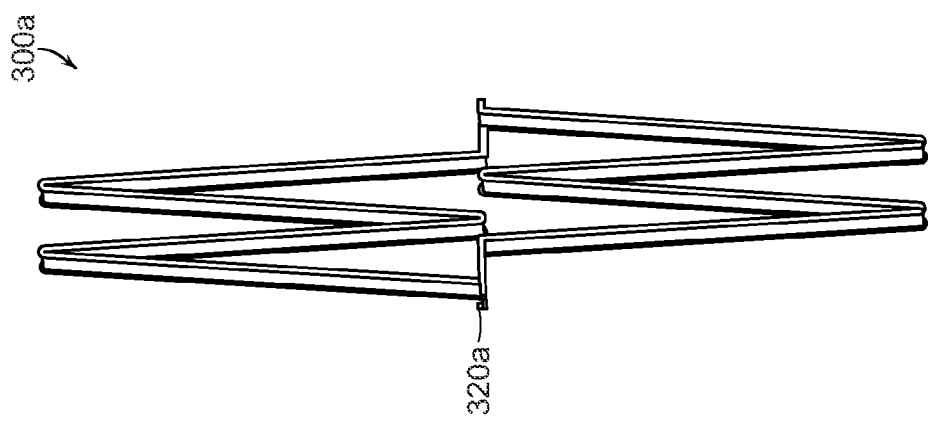

FIGS. 3A-3B are diagrams illustrating an exemplary connection mechanism between flat panel arrays 300a and 300b. FIG. 3A illustrates a partially deployed flat panel array 300a. The flat panel array 300a includes two rows of panels that are connected via a connection mechanism 320a (e.g., spring hinge, carpenter tape hinge, etc.). In other words, the connection mechanism 320a holds the two rows of panels together for deployment of the flat panel array 300a. FIG. 3B illustrates another partially deployed panel array 300b.

Figure 4:
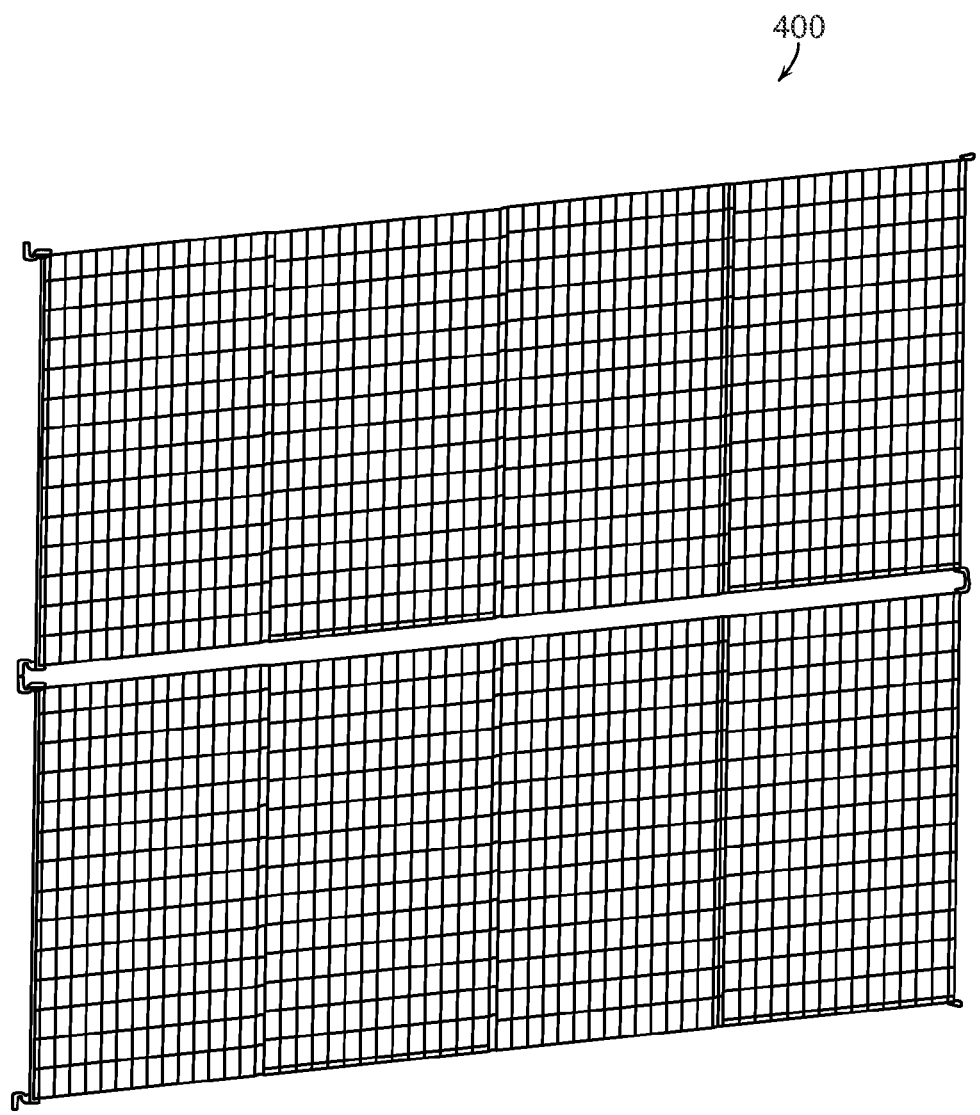
FIG. 4 is a diagram illustrating an exemplary deployment of a flat panel array.

FIG. 4 is a diagram illustrating an exemplary deployment of a flat panel array 400 (also referred to as a deployed position). As illustrated in FIG. 4, the panel array 400 is formable substantially in a planar shape. In some examples, the panel array 400 is a solar panel array or a radar array panel.

Figure 5:
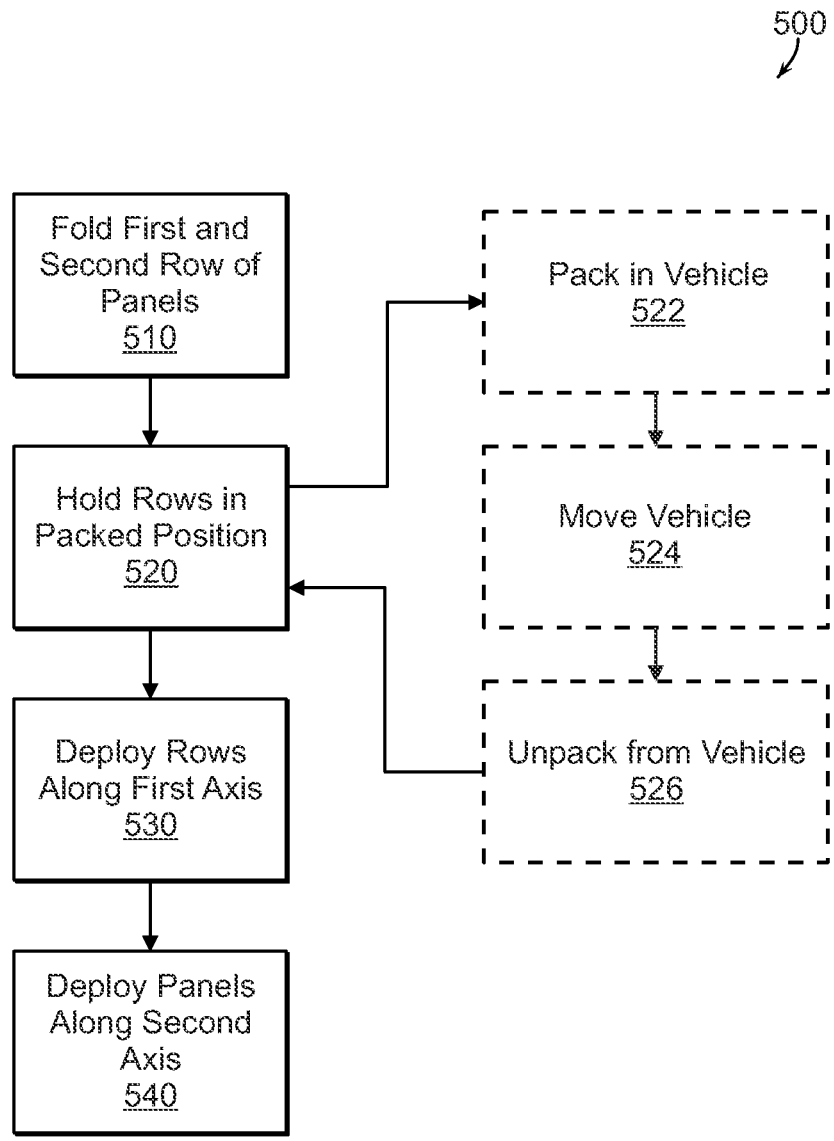
FIG. 5 is a flowchart of an exemplary deployment process for a flat panel array.

FIG. 5 is a flowchart of an exemplary deployment process for a flat panel array 400 of FIG. 4. A folding mechanism (e.g., forklift, robot, etc.) folds (510) a first row of panels and a second row of panels. Each row includes at least two respective panels coupled via a carpenter tape hinge to form the panel array and allow for multi-axial deployment of the panel array. The folding generates a spring force (e.g., ten pounds of force, one thousand pounds of force, etc.). A holding mechanism (e.g., clip, cylinder, etc.) holds (520) the first and the second rows in a packed position. The carpenter tape hinge via the spring force deploys (530) the first and second rows along a first axis. A deployment mechanism (e.g., pulley system, electronic motor, etc.) deploys (540) the panels for each row along a second axis.

In other examples, a packing mechanism (e.g., robot, robotic mechanism, etc.) packs (522) the panel array in the packed position in a vehicle (e.g., truck, spacecraft, aircraft, etc.). The vehicles moves (524) from a first location to a second location. An unpacking mechanism (e.g., robot, robotic mechanism, etc.) unpacks (526) the panel array from the vehicle for deployment. In some examples, the panel array is transported in the packed position to a second location for deployment. The panel array can be, for example, mounted to a vehicle or associated with a vehicle as a separate component.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A deployable flat panel array, the panel array comprising:
   a first row of panels;
   a second row of panels; and
   at least two respective panels of each of the first and the second rows coupled together via a carpenter tape hinge and allowing for multi-axial deployment to form the panel array,
   wherein the at least two respective panels of each of the first and the second rows are deployable by rotation substantially along a first-axis, and
   wherein the first row of panels and the second row of panels are deployable by a uni-directional unfolding along a second-axis to form the panel array,
   wherein the first row of panels is interconnected with the second row of panels at only each outer edge of the first and second row of panels, wherein the first and second row of panels are disconnected at middle parts of the first and second row of panels.

2. The panel array of claim 1, wherein the panel array is formable substantially in a planar shape.

3. The panel array of claim 1, wherein the panel array is deployable substantially in a planar direction.

4. The panel array of claim 1, wherein the first-axis and the second axis are formable substantially for coplanarity between the deployed first and the deployed second rows.

5. The panel array of claim 1, further comprising a plurality of panels of the first and the second rows, wherein the plurality of panels are stowable substantially in an accordion array.

6. The panel array of claim 1, the at least two respective panels of each of the first and the second rows are coupled such that the first and the second rows are simultaneously deployed.

7. The panel array of claim 1 further comprising:
   a second set of panels of the panel array, the second set of panels comprising:
   a third row of panels;
   a fourth row of panels; and
   at least two respective panels of each of the third and the fourth rows coupled together via a carpenter tape hinge and allowing for multi-axial deployment to form the panel array,
   wherein the first row of panels, the second row of panels, and the at least two respective panels for of each of the first and the second rows comprise a first set of panels of the panel array.

8. The panel array of claim 7, wherein the first set of panels and the second set of panels are interleaved for storage.

9. The panel array of claim 7, wherein the first set of panels and the second set of panels are independently deployable.

10. The panel array of claim 1, wherein the panel array comprising a solar panel array or a radar array panel.

11. A deployable flat panel array, the panel array comprising:
  a first row of panels;
  a second row of panels; and
  at least two respective panels of each of the first and the second rows coupled together,
  via a spring hinge means and allowing for multi-axial deployment to form the panel array,
  wherein the at least two respective panels of each of the first and the second rows are deployable by rotation substantially along a first-axis, and
  wherein the first row of panels and the second row of panels are deployable by a uni-directional unfolding along a second-axis to form the panel array,
  wherein the first row of panels is interconnected with the second row of panels at only each outer edge of the first and second row of panels, wherein the first and second row of panels are disconnected at middle parts of the first and second row of panels.

12. A deployable panel array, the panel array comprising:
  a plurality of interconnected panel rows coupled via a spring hinge means;
  wherein each panel row comprising a plurality of panels coupled together; and
  wherein the panel array being deployable along two dimensions between a packed position and a deployed planar position,
  wherein at least two panels from each of a first panel row and a second panel row are deployable by rotation substantially along a first-axis, and
  wherein the first panel row and the second panel row are deployable by a uni-directional unfolding along a second-axis to form the panel array,
  wherein the first row of panels is interconnected with the second row of panels at only each outer edge of the first and second row of panels, wherein the first and second row of panels are disconnected at middle parts of the first and second row of panels.

13. The panel array of claim 12, wherein in the packed position, the plurality of interconnected panel rows are interleaved.

14. A method for deploying a flat panel array, the method comprising:
  folding a first row of panels and a second row of panels, wherein each row comprising at least two respective panels coupled via a carpenter tape hinge to form the panel array and
  allowing for multi-axial deployment of the panel array, wherein the folding generates a spring force;
  holding the first and the second rows in a packed position via a holding mechanism;
  deploying the first and second rows along a first-axis using the spring force in the carpenter tape hinge; and
  deploying the panels for each row along a second-axis using a deployment mechanism; wherein the first row of panels is interconnected with the second row of panels at only each outer edge of the first and second row of panels, wherein the first and second row of panels are disconnected at middle parts of the first and second row of panels.

15. The method of claim 14, wherein the first-axis and the second-axis are formable substantially for coplanarity between the deployed first and the deployed second rows.

16. The method of claim 14, further comprising:
  packing the panel array in the packed position in a vehicle;
  moving the vehicle from a first location to a second location; and
  unpacking the panel array from the vehicle for deployment.

17. The method of claim 14, further comprising transporting the panel array in the packed position to a second location for deployment, wherein the panel array is mounted to a vehicle or associated with a vehicle as a separate component.

* * * * *